United States Patent Office 3,481,815
Patented Dec. 2, 1969

3,481,815
SILANE COUPLING AGENTS FOR ARYL-CONTAINING, THERMALLY STABLE POLYMERS II
Arthur J. Barry and Edwin P. Plueddemann, Midland, Mich., assignors to Dow Corning Corporation, Midland, Mich., a corporation of Michigan
No Drawing. Continuation-in-part of application Ser. No. 486,228, Sept. 9, 1965. This application June 20, 1967, Ser. No. 647,323
Int. Cl. C09j 3/00
U.S. Cl. 156—329     11 Claims

ABSTRACT OF THE DISCLOSURE

A process for bonding thermally stable polymers to a solid siliceous, metal or metal oxide substrate with the aid of a silane coupling agent selected from the group consisting of those of the formulae (I)
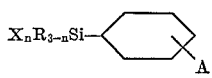

and (II)
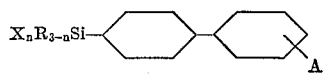

wherein X is a hydroxyl or a hydrolyzable group, R is a hydrogen atom or a monovalent hydrocarbon radical of no more than 7 carbon atoms, $n$ has a value of 1 to 3, and A is selected from the group consisting of the —COOR, —COOR', —C(OR)$_3$, —CH(OR)$_2$, —CH$_2$OR, —CX'$_3$, —CHX'$_2$, —CH$_2$X', —CH$_2$NR$_2$, —OH, —SH, —CN, —X',

and —NR$_2$ groups wherein R' is +NHR$_3$, R is as defined above, and X' is selected from the group consisting of the chlorine, bromine and iodine atoms, A being an —OH group only when the silane coupling agent has Formula II.

---

This application is a continuation-in-part of our abandoned application Ser. No. 486,228 filed Sept. 9, 1965.

This application relates to new coupling agents for the recently-developed, aryl-containing polymers which are comparable to silicone resins in their thermal stability. Examples of such polymers include the polybenzimidazoles, polyimides and polyoxadiazoles.

A considerable amount of effect has been expended in attempting to develop structural materials incorporating these polymers; for example, glass fabric laminates possessin gexcellent thermal stability have been prepared using polybenzimidazole resins.

Laminates with improved physical properties are obtained when the glass fabric is pretreated with a coupling agent, e.g. Owens-Corning's H.T.S. finish, which is a mixture of an aminopropyltrialkoxysilane and an epoxy resin. However, when coupling agents of the above type are employed the bond which is formed between resin and glass or other substrate is weakened by prolonged exposure to temperatures of about 315° C. (600° F.) and up, despite the fact that the resins used in this invention are capable of withstanding such temperatures. This weakness shows up in a sharp drop in the strength of laminates made from these resins after exposure to prolonged high temperatures, especially when followed by exposure to boiling water. Coupling agents such as the H.T.S. finish and many others often yield resin-inorganic substrate bonds which have less hydrolytic stability after intense heating than the corresponding resin-inorganic substrate bonds which are entirely free of any coupling agent.

The silane coupling agents of this invention have been found to particularly improve the hydrolytic stability of bonds between the above resins and inorganic substrates, and the improvement is not lost upon exposure to high temperatures.

This invention relates to the process of bonding (a) a thermally stable resinous polymer with aryl-containing recurring units, to
(b) a solid substrate selected from the group consisting of siliceous materials, metallic oxides, and metals, comprising,
    (1) applying to the surface of at least one of (a) and
        (b) a material
(c) comprising a substance selected from the group consisting of compounds of the formulae (I)
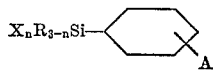

and (II)
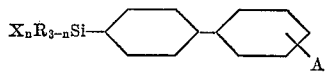

wherein X is a hydroxyl or a hydrolyzable group, R is a hydrogen atom or a monovalent hydrocarbon radical of no more than 7 carbon atoms, $n$ has a value of 1 to 3, and A is selected from the group consisting of the —COOR, —COOR', —C(OR)$_3$, —CH(OR)$_2$, —CH$_2$OR, —CX'$_3$, —CHX'$_2$, —CH$_2$X', —CH$_2$NR$_2$, —OH, —SH, —CN, —X',

and —NR$_2$ groups wherein R' is +NHR$_3$, R is as defined above, and X' is selected from the group consisting of the chlorine, bromine and iodine atoms, A being an —OH group only when the substance has Formula II,
    (2) contacting (a) and (b) with each other with
        (c) between them while (a) is in a thermoplastic
        state and at least one of (a) and (b) is in a plastic
        state, and
    (3) applying energy to the composite of (a), (b)
        and (c) until a bond is formed between them
        which is superior in hydrolytic stability to the
        bond between (a) and (b) alone.

At least one of ingredients (a) and (b) must be in a plastic state at some time while the two are in contact with each other so that good contact is made by their respective surfaces. By "plastic state" is meant a permanently deformable state, for example, a gum, a paste, a solution, or a fluid.

To be placed in a plastic state, ingredient (a) can, for example, be melted or softened by heating. A plastic form of ingredient (b) is found in an unvulcanized silicone rubber.

The statement "(a) is in a thermoplastic state" means that (a) must be of a sufficiently low molecular weight to be meltable. Ingredient (a) can, however, cure to an infusible resin during or after step (3) of the above process. Steps (2) and (3) above can be performed simultaneously, if desired.

Ingredient (a) can be any thermally-stable polymer of the above description. By "thermally stable" it is meant that the cured polymers should not undergo significant decomposition while undergoing thermogravimetric analysis in nitrogen with a rate of temperature increase of 150° C. (300° F.) per hour until a temperature of at least 400° C. (750° F.) is reached.

Examples of resins which are suitable for use in ingredient (a) are polythiazoles such as

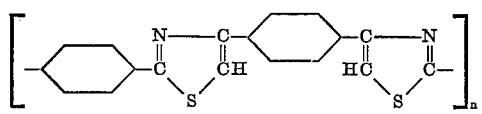

polyoxadiazoles such as

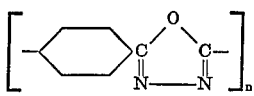

polytriazoles such as

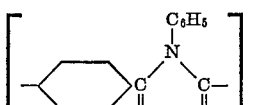

benzborimidazoline polymers such as

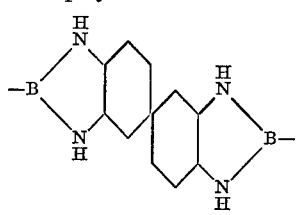

polytriazines such as the zinc chelate of the triazine of the formula

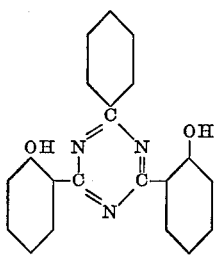

and polymers of the formula

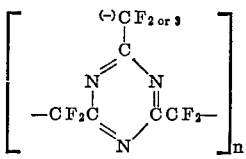

polyphenoxides such as

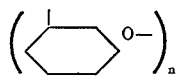

polyphenylene sulfide polymers, silphenylenes such as

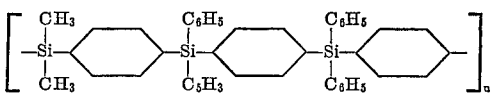

polyphenyl polymers, polyimides such as

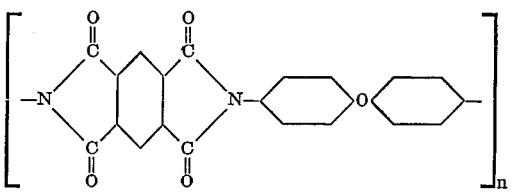

polyimidazopyrrolidones such as

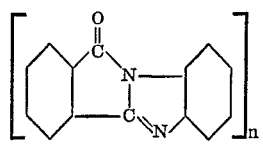

and polybenzimidazoles such as

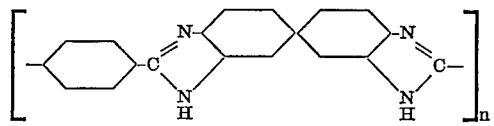

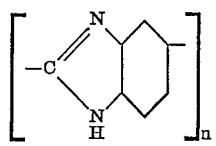

and

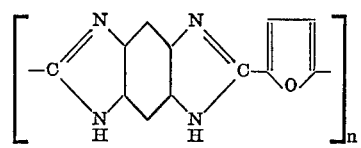

Many varieties of polybenzimidazoles and other types of polymers which are useable in this invention are suggested in the article by C. S. Marvel which begins on p. 220 of the March 1964, issue of the Society of Plastics Engineers Journal. Other useful information on heat-stable aryl polymers is found in the preprints of the May 1962, Conference on High Temperature, Polymer, and Fluid Research, sponsored by the Polymer Branch of The Aeronautical Systems Division, Wright-Patterson A.F.B., Dayton, Ohio.

Organopolysiloxane resins can also be used in this invention, although they rarely have adhesion difficulties with siliceous substrates.

Ingredient (b) is preferably glass fiber or fabric, but it can also be any other siliceous material such as fibrous or crushed quartz, silica or glass powders, silicone rubber, asbestos, clay, silicon carbide, glass sheet; metallic oxides such as alumina, titania, $Fe_2O_3$, cerium oxide; and metals such as aluminum, boron, steel, copper, silver, and lead in fibrous, sheet, or powder forms.

Ingredient (c) can be any silane of the above description or hydrolyzate thereof. By "hydrolyzate" it is meant that the silane has been hydrolyzed, but that condensation of the silanes has not proceeded so far as to substantially eliminate the hydroxyl groups and any remaining hydrolyzable groups from the composition.

X can be the hydroxyl group or any hydrolyzable group e.g., alkoxy radicals such as methoxy, ethoxy, or butoxy; alkoxyalkoxy radicals such as ethoxymethoxy, methoxymethoxy, or methoxyethoxy; acyloxy groups such as acetoxy or butyroxy; halogen atoms such as chlorine or bromine; ketoxime radicals such as $(CH_3)_2CNO$— or

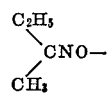

or the isocyanate group. Lower alkoxy radicals are preferred.

It is also preferred for $n$ to be 3.

R can be hydrogen or any monovalent hydrocarbon radical of no more than 7 carbon atoms, e.g. methyl, ethyl, isopropyl, sec-hexyl, cyclohexyl, vinyl, cyclopentenyl, phenyl, or tolyl.

Examples of ingredients (c) are

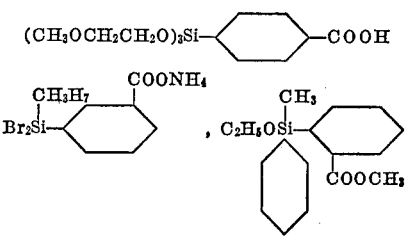

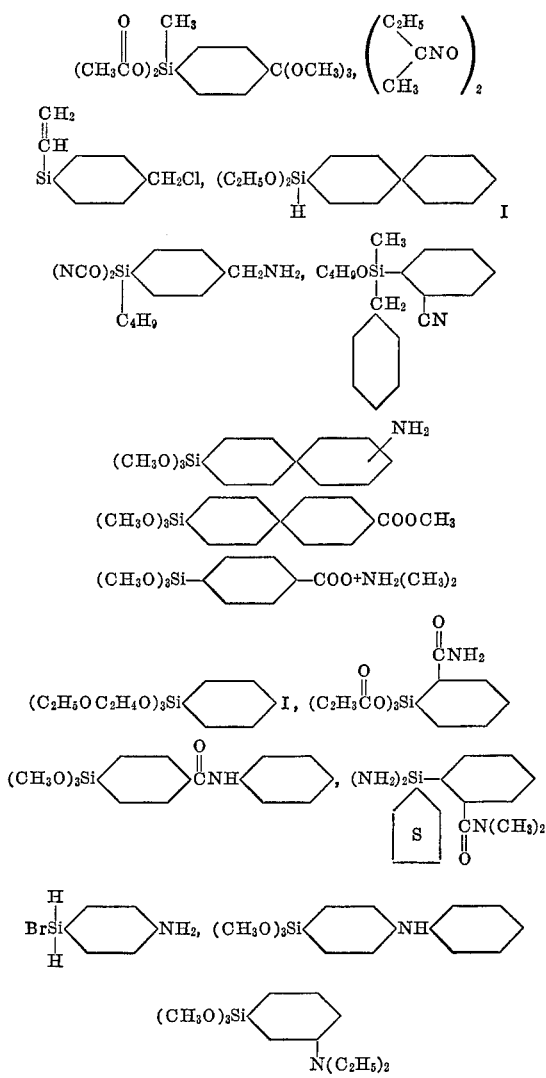

and hydrolyzates of the above.

Ingredient (c) can be applied to the surface of either (a) or (b) by any technique such as dipping, brushing, or spraying. Solutions or dispersions of ingredients (c) either in water or an organic solvent can be used, or ingredient (c) can be applied in the pure form. It is generally applied to ingredient (b), the inorganic substrate, any dispersing agent or solvent being allowed to dry before the resin, ingredient (a), is applied.

The term "applying to the surface" also includes the use of ingredient (c) as an additive in either ingredient (a) or (b), homogeneously mixed therein, since a small amount of (c) will necessarily be found on the surface of any ingredient to which it is added. For example, from 0.1 to 10 weight percent, based on (a), of ingredient (c) can be mixed into a plastic form of ingredient (a), preferably with heating to at least 500° F. The resin can then be solidified to yield a thermally stable resin having stable adhesion to glass and other forms of ingredient (b).

Also, a mixture of ingredient (a) and (c) can be used as an adhesive for bonding more ingredient (a) to a material used ash ingredient (b). The ingredient (a) of the adhesive does not have to be identical to the ingredient (a) which is to be bonded, as long as they are compatible with each other. The above mixture is also useful as a size for glass fibers.

In a typical use of this invention, glass cloth (b) is impregnated with ingredient (c) and allowed to dry. Then the glass cloth is impregnated by hot pressing with the resin [ingredient (a)]. Other techniques which are obvious to those skilled in the art are also available. For example, the resin can be treated with ingredient (c) and then contacted with an unvulcanized silicone elastomer to obtain improved bonding upon curing of the elastomer; or steel fibers which have been treated with (c) can be impregnated with the resin (a).

The improved bond is formed through the application of energy to (a), (b), and (c), usually in the form of heat. The temperature does not appear to be critical, but best results are achieved if temperatures of at least 315° C. (600° F.) are used, the heating time being over one hour. Other useable forms of energy are X-rays and gamma-rays.

The following examples are illustrative only and should not be construed as limiting the invention. All percent referred to herein are on a weight basis unless otherwise specified.

EXAMPLE 1

The coupling agents used in this example were prepared as follows:

(Chlorophenyl)trichlorosilane 212 g. of phenyltrichlorosilane and 1 g. of ferric chloride were placed in a flask, heated to 30–35° C., and then chlorine passed into the mixture while it was being stirred until a gain in weight of 35 g. was obtained. The product was distilled with a major fraction boiling at 222–227° C. being collected ($d_4^{25}$ 1.425, $n_D^{25}$ 1.5390). Analysis of the product by infrared spectroscopy indicated the presence of mixed isomeric (chlorophenyl)trichlorosilanes (4% ortho, 76% meta, 34% para).

(Bromophenyl)trimethoxysilane

A Grignard reagent prepared from 944 g. of p-dibromobenzene and 100 g. magnesium in three liters of ether was refluxed overnight with 700 g. silicon tetrachloride. The salts were filtered off and the filtrate distilled to recover 226 g. of (bromophenyl)trichlorosilane having a boiling point of 117–122° C. at 10 mm. of mercury pressure. This material was 99+% pure by gas-liquid chromatography analysis and appeared by infrared analysis to be the pure para-isomer. 128 g. of methanol was added over a period of one hour to 29 g. of the (bromophenyl)trichlorosilane with stirring while pulling off HCl through a water aspirator. The reaction was strongly exothermic and external heat was finally applied to warm the mixture to 50° C. Only a trace of chlorosilane remained. 5 g. of methyl orthoformate was then added and the mixture warmed briefly to 70° C. to obtain a neutral product. Distillation gave 25 g. of (bromophenyl)trimethoxysilane having a boiling point of 84° C. at 0.9 mm. of mercury pressure.

(Bromophenyl)dimethylethoxysilane

The Grignard reagent from 472 g. of p-dibromobenzene and 48 g. of magnesium in 1500 ml. of ether was refluxed overnight with 196 g. of dimethylchlorosilane. After filtering off the magnesium salts the filtrate was distilled to give 237 g. of (bromophenyl)dimethylchlorosilane having a boiling point of 64–66° C. at 1.2 mm. of mercury pressure. A 98.2 g. portion of the (bromophenyl)dimethylchlorosilane was refluxed for 95 hours in 200 ml. of ethanol in which a small piece of sodium was dissolved. The mixture was distilled to obtain about 60 g. of (bromophenyl)dimethyl ethoxysilane (98% pure by gas-liquid chromatography) having a boiling point of 62.5–64° C. at 0.3 mm. of mercury pressure. Elemental analysis showed 10.75% Si and 30.4% Br as compared to theoretical values of 10.84% Si and 30.83% Br.

(Bromobiphenylyl)trichlorosilane

To 287.5 g. of biphenylyltrichlorosilane in 800 ml. of carbon tetrachloride containing 0.5 g. of iron powder, there was added 160 g. of bromine in 100 ml. of carbon tetrachloride over a period of 200 minutes. After refluxing overnight the mixture was distilled to recover 291 g.

of (bromobiphenylyl)trichlorosilane over a range of 145–180° C. at 0.5 mm. of mercury pressure.

(Bromobiphenylyl)methyldichlorosilane 100 ml. of a 1 molar solution of methylmagnesium iodide in ether was added with stirring at room temperature to solution of 0.1 mol of bromobiphenylyltrichlorosilane in 200 ml. of tetrahydrofuran. The mixture was refluxed for one hour, filtered, the residue extracted with tetrahydrofuran, and then the filtrate distilled to obtain a crude product which had a boiling point of 140–170° C. at 0.5 mm. of mercury pressure and an acid equivalent weight of 175.

N,N-dimethyl-p-(trimethoxysilyl)aniline

[p - (Dimethylamino)phenyl]trichlorosilane was prepared by placing 135.5 g. of trichlorosilane, 242 g. of N,N-dimethylaniline and 0.5 g. of boric acid in a 1.8 liter bomb, sealing the bomb, and then heating it for 8 hours at 290° C. A 17% yield of the product was obtained having a boiling point of 168–171° C. at 16 mm. of mercury pressure.

A slurry of 435 g. of sodium methylate in 1500 ml. of methanol was added slowly with stirring to a solution of 550 g. of [p-(dimethylamino)phenyl]trichlorosilane in 400 ml. of benzene while cooling in an ice bath. The product was stripped directly to recover 190 g. of distillate having a boiling point of 70–120° C. at 0.5–1.0 mm. of mercury pressure. The distillate was then fractionated in a spinning band column to recover 90 g. of N,N-dimethyl-p-(trimethoxysilyl)aniline having a boiling point of 97–102° C. at 0.2 mm. of mercury pressure. The product had a refractive index of 1.5455 at 25° C. Elemental analysis of the product for silicon content gave results of 11.63% and 11.79% as compared to a theoretical value of 11.62%. Infrared spectroscopy indicated that the product was entirely the para-isomer.

(Aminophenyl)triptychsiloxazolidine

To 250 ml. of 90% nitric acid there was slowly added 129 g. of a phenylsilsesquioxane (obtained by the hydrolysis of phenyltrichlorosilane), with stirring, at 10–20° C. The temperature rose briefly to 55–60° C. The mixture was poured over cracked ice to recover 118 g. of nitrophenylsilsesquioxane as a yellow solid. A mixture of 87 g. of the nitrophenylsilsesquioxane, 78 g. of triethanolamine and 200 g. of xylene was warmed on a hot plate set on "low" for one hour, cooled, and then poured into an equal mixture of isopropanol and hexane to recover a dark solid. Recrystallization from xylene gave 43.4 g. of light yellow crystals of the triptych compound. Titration with perchloric acid indicated an amine equivalent of 298 as compared to a theoretical value of 296 for the (nitrophenyl)triptychsiloxazolidine. A mixture of 8.19 g. of (nitrophenyl)triptychsiloxazolidine, 140 ml. of acetone, 25 ml. of methyltrimethoxysilane and 0.11 g. of platinum oxide was pressurized to 40 p.s.i. with hydrogen for seven hours, at which time there was no further take-up of the gas. A crystalline solid was separated and recrystallized from 200 ml. of acetonitrile to recover 3.8 g. of light yellow crystals. In titration with perchloric acid it was observed that 50.6% of the titrant was consumed immediately while the remainder took several minutes to come to a permanent end point. This would be expected from a compound having two nitrogens differing greatly in availability for protonation. Total titration corresponded to an amine equivalent of 136 as compared to a theoretical value of 133 for the (aminophenyl)triptychsiloxazolidine.

(Aminophenyl)methyldiethoxysilane

A mixture of 670 g. of phenylmethyldichlorosilane, 882 g. of sodium fluorosilicate and 400 ml. of tetrahydronaphthalene was refluxed for one hour under nitrogen and then distilled to yield 471 g. of phenylmethyldifluorosilane having a boiling point of 143–145° C. at atmospheric pressure. A solution of 471 g. of the phenylmethyldifluorosilane in one liter of chloroform was nitrated below 20° C. with 315 g. of 90% nitric acid in 700 g. of concentrated sulfuric acid to obtain 562 g. of (nitrophenyl)methyldifluorosilane. A 40.6 g. portion of this product was refluxed for 40 hours with 41.6 g. of ethyl silicate and then distilled to recover 18.7 g. of (nitrophenyl)methyldiethoxysilane having a boiling point of 73–78° C. at 0.03 mm. of mercury pressure. Elemental analysis of the product was consistent with the theoretical values. A mixture of 16.7 g. of the (nitrophenyl)methyldiethoxysilane, 125 ml. of ethanol, 20 g. of tetramethoxysilane (water scavenger) and 0.2 g. platinum oxide was pressurized with hydrogen until no more was taken up at 40 p.s.i. pressure. Distillation gave 8 g. of liquid (aminophenyl)methyldiethoxysilane (90% pure by gas-liquid chromatography) having a boiling point of 85–95° C. at 0.2 mm. of mercury pressure. The product had a refractive index of 1.4910 at 25° C. Elemental analysis showed 54.5% C, 8.24% H, 5.12% N and 14.26% Si as compared to theoretical values of 59.2% C, 8.44% H, 6.2% N and 12.6% Si.

(Aminophenyl)dimethylpropoxysilane

A mixture of 512 g. of phenyldimethylchlorosilane, 477 g. sodium fluorosilicate and 400 ml. tetralin was refluxed for two hours under nitrogen and distilled to obtain 397 g. of phenyldimethylfluorosilane having a boiling point of 154–164° C. To a solution of 308 g. of the phenyldimethylfluorosilane in 670 ml. of chloroform at 5° C. there was added a mixture of 225 g. of 90% nitric acid and 500 g. of concentrated sulfuric acid during one hour. After stirring overnight, the chloroform layer was separated and distilled to obtain 257 g. of (m-nitrophenyl)dimethylfluorosilane having a boiling point of 90–95° C. at 1.5 mm. of mercury pressure, and 47.5 g. of a material having a boiling point of 95–107° C. at 1.5 mm. of mercury pressure. The residue decomposed explosively. Ammonia was bubbled for 20 minutes through a solution of 45 g. of n-propanol in 100 ml. of heptane. The ammonia addition was continued while dropping in 80 g. of (m-nitrophenyl)-dimethylfluorosilane. Stiring continued for 20 hours while a total of 100 ml. of liquid ammonia was evaporated from a cold trap and passed through the solution. After filtering off solids, the filtrate was distilled to yield 83 g. of (m-nitrophenyl)dimethylpropoxysilane having a boiling point of 100–115° C. at 0.05 mm. of mercury pressure. A mixture of 28 g. of the (m-nitrophenyl)dimethylpropoxysilane, 130 ml. of n-propanol and 0.2 g. of platinum oxide were hydrogenated at 40 p.s.i. until the pressure remained constant. Distillation of the product yielded 10.8 g. of (aminophenyl)dimethylpropoxysilane having a boiling point of 83° C. at 0.5 mm. of mercury pressure. Elemental analysis showed 13.3% Si, 6.83% N, 62.65% C and 9.26% H as compared to theoretical values of 13.4% Si, 6.7% N, 63.1% C and 9.1% H.

(Cyanophenyl)trimethoxysilane

A mixture of 65 g. of (bromophenyl)trimethoxysilane, 32 g. of cuprous cyanide and 50 g. of methylpyrrolidinone, was refluxed at 190° C. for four hours. 20 g. of sodium cyanide was added and the mixture distilled to 150° C. at 1 mm. of mercury pressure leaving a large tarry residue. The distillate was redistilled to separate the solvent and recover 15 g. of (cyanophenyl)trimethoxysilane (89% pure) having a boiling point of 95–100° C. at 4 mm. of mercury pressure. The product had a refractive index of 1.5001 and a density of 1.143 at 25° C.

(Bromomethyl)phenyltrimethoxysilane 902 g. of tolyltrichlorosilane was illuminated with a 15 watt bulb while simultaneously adding 640 g. of bromine and bubbling in chlorine. The rate of bromine addition was regulated to maintain an excess of bromine, as shown by the color of the mixture. Examination of the crude product by gas-liquid chromatography indicated above 85% conversion to higher boiling products. Some bromine, no doubt, was lost in the stream of evolved HCl. The crude product was methoxylated and distilled. After distilling off unbrominated tolyltrimethoxysilane there was recovered 703 g. of (bromomethyl)phenyltrimethoxysilane having a boiling point of 110–112° C. at 0.6 mm. of mercury pressure. The product had a refractive index of 1.5132 and a density of 1.3208 at 25° C.

Hydrolyzate of (carboxyphenyl)trimethoxysilane 152 g. of tolyltrichlorosilane was hydrolyzed in a toluene-water mixture and dried to recover 81 g. of a tolylsilsesquioxane resin. A solution of 71.5 g. of this resin in 200 ml. of benzene was added to a solution of 400 g. of sodium hydroxide and 267 g. of potassium permanganate in 4 liters of water and the mixture refluxed with stirring for one hour. The benzene was removed azeotropically and the residue refluxed for 3.5 hours. The excess permanganate was destroyed by adding 80 ml. of ethanol and the manganese dioxide that precipitated was filtered off. The filtrate was acidified with concentrated hydrochloric acid to a pH of 3. A white precipitate was filtered off and washed with water until the washings were free of chloride. The dried solid, carboxyphenylsilsesquioxane, weighed 51 g. This product has a low solubility in water and common organic solvents.

Laminates were made from heat-cleaned No. 181 type S glass cloth, supplied by Owens-Corning Fiberglas, which had been treated with a coupling agent, and the polybenzimidazole resin which is the condensation product of isophthalic acid and 3,3-diaminobenzidine (AFR–151, made by The Whittaker Corporation, Narmco Research and Development Division).

The glass cloths used had been previously dipped in a 0.5% solution of a silane coupling agent, the solvent in the case of chlorosilanes being toluene, and the solvent in the case of alkoxysilanes being equal parts of water and isopropanol with 0.5% of acetic acid to promote hydrolysis. The glass cloths were then allowed to dry.

Fifteen 9" x 9" pieces of glass cloth and about 170 g. of resin was used to make each laminate. The resin was sprinkled in powdered form between the plys of the laminate, and the laminate was then pressed at low pressure for 5 minutes at 350° F.

The laminate was then pressed at 700° F. at low pressure repeatedly for 10-second periods to disperse the resin and to squeeze the excess out of the laminate so as to leave it with about a 20 weight percent resin content. The laminate was then pressed for 3 hours at 200 p.s.i. and 700° F. to cure the resin laminate into an infusible mass.

The laminates were then post-cured under helium for 24 hours at 600° F., 24 hours at 650° F., 24 hours at 700° F., and 18 hours at increasing temperatures up to 850° F.

The laminates were tested on a Baldwin Universal Testing Machine in accordance with federal specification L–P–406b.

The results were as follows:

| Coupling Agent | Initial Flexural Strength (p.s.i.) | Flexural Strength (p.s.i.) after— 2 hrs. in boiling water | 200 hrs. at 600/ F. and 2 hrs. in boiling water | Weight percent resin in laminate |
|---|---|---|---|---|
| None* | 85,100 | 13,700 | 8,100 | 20.2 |
| H.T.S. coupler* | 114,200 | 83,600 | 5,600 | 20.7 |
|  Cl–⌬–SiCl₃ | 90,700 | 21,200 | 11,500 | 18.1 |
|  Br–⌬–Si(OCH₃)₃ | 108,600 | 32,700 | 14,300 | 21.7 |
|  Br–⌬–Si(CH₃)₂OC₂H₅ | 98,500 | 14,900 | 11,700 | 20.4 |
|  Br–⌬–⌬–SiCl₃ | 97,200 | 41,000 | 19,900 | 21.5 |
|  Br–⌬–⌬–SiCl₂CH₃ | 89,600 | 44,500 | 13,000 | 1.9 |
|  (CH₃)₂N–⌬–Si(OCH₃)₃ | 107,200 | 45,000 | 16,400 | 22.8 |
|  H₂N–⌬–Si(OCH₂CH₂)₃N | 114,900 | 46,450 | 12,900 | 21.7 |
|  H₂N–⌬–Si(OC₂H₅)₂CH₃ | 74,850 | 17,600 | 11,400 | 21.2 |
|  H₂N–⌬–Si(CH₃)₂OCH₂CH₂CH₃ | 78,000 | 16,500 | 13,200 | 21.9 |
|  NC–⌬–Si(OCH₃)₃ | 116,700 | 52,500 | 18,500 | 21.5 |
|  BrCH₂–⌬–Si(OCH₃)₃ | 102,500 | 76,500 | 25,900 | 21.8 |
| Hydrolyzate of  HOOC–⌬–Si(OCH₃)₃ | 91,800 | 54,500 | 27,500 | 22.5 |

*For comparison.

EXAMPLE 2

The coupling agents of this example were prepared as follows:

Methyl ester of (carboxyphenyl)trimethoylsilane (partial hydrolyzate)

To 20 g. of (caroxyphenyl)silsesquioxane dissolved in 100 ml. of dimethylformamide there was added 59 g. of thionyl chloride. After a slight exotherm to 50° C. the mixture was stripped under vacuum while warming to 60° C. to remove hydrogen chloride, sulfur dioxide and excess thionyl chloride. The residue, titrating to contain 0.3 equivalent of acid, was poured into 200 ml. of methanol containing 30 g. of triethylamine and then filtered to remove the triethylamine hydrochloride produced. The filtrate was found to be neutral. Infrared analysis showed the product to contain an absorption typical of ester corbonyls at 1715 cm. $^{-1}$. This crude product was used as a coupling agent from aqueous methanol.

(Chloromethyl)phenyltrimethoxysilane

A mixture of 225 g. of the mixed isomers of tolyltrichlorosilane (5% ortho, 63% meta, 32% para) and 1.5 g. of azobisobutyronitrile was warmed to 120–130° C. while chlorine was added for 1.5 hours. About 0.9 mol of chlorine was consumed. Distillation gave a 71.5% yield of (chloromethyl)phenyltrichlorosilane having a boiling point of 138–139° C. at 0.5 mm. of mercury pressure. 117.6 g. of this product was warmed to 45° C. while adding 48 g. of methanol beneath the surface. A slight vacuum was pulled on the system during the methanol addition to facilitate the removal of the hydrogen chloride. Finally, 5 g. of methylorthoformate was added to methoxylate the last traces of the chlorosilane. The product was then distilled to obtain 104 g. of (chloromethyl)-phenyltrimethoxysilane having a boiling point of 139–143° C. at 10 mm. of mercury pressure.

(Methoxymethyl)phenyltrimethoxysilane

247 g. of (chloromethyl)phenyltrimethoxysilane was added to a solution of sodium methoxide prepared from 23 g. of sodium and 500 ml. of methanol. The mixture was heated for 10 hours at 70–75° C., filtered to remove the sodium chloride, and then distilled to obtain 187 g. of (methoxymethyl)phenyltrimethoxysilane having a boiling point of 91–96° C. at 0.5 mm. of mercury pressure ($n_D^{25}$ 1.4790, $d_4^{25}$ 1.081).

(Aminomethyl)phenyltrimethoxysilane

A 0.2 liter bomb was charged with 36 g. of ammonia, 50 g. of (chloromethyl)phenyltrimethoxysilane and 50 g. of methanol, and then sealed and warmed at 80° C. for 20 hours at a maximum pressure of 90 p.s.i. The cooled product was neutralized with sodium methoxide solution, filtered to remove the sodium chloride, and then distilled to obtain 11.8 g. of (aminomethyl)phenyltrimethoxysilane having a boiling point of 110° C. at 0.5 mm. of mercury pressure ($n_D^{25}$ 1.4981, $d_{15}^{25}$ 1.105). Elemental analysis of the product showed 13.2% Si and 5.82% N compared to theoretical values of 12.3% Si and 6.17% N.

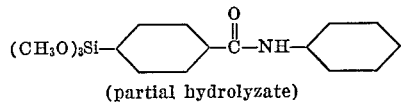
(partial hydrolyzate)

To 20 g. of (carboxyphenyl)trimethoxysilane dissolved in 100 ml. of dimethylformamide there was added 59 g. of thionyl chloride. After a slight exotherm to 50° C. the mixture was stripped under vacuum while warming to 60° C. to remove hydrogen chloride, sulfur dioxide and excess thionyl chloride. The residue was poured into excess aqueous ammonia to obtain a crude partial hydrolyzate of

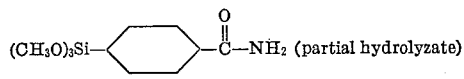

This crude product was used as a coupling agent from aqueous methanol.

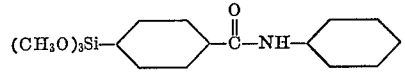
(partial hydrolyzate)

The preceding procedure was repeated except that the residue was poured into excess aniline to obtain a crude partial hydrolyzate of

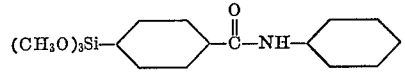

This crude product was then poured into water to obtain a cream colored precipitate of the hydrolyzate. This precipitate was removed from the aqueous aniline hydrochloride solution by filtration and then dissolved in acetone for use as a coupling agent.

When laminates of glass cloth and a polymide resin of the unit formula

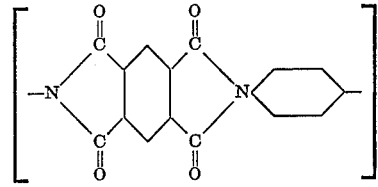

are prepared and tested in the manner of Example 1, using the above materials as coupling agents, the product laminates possess improved compressive strength over equivalent laminates containing previously known couplers after the laminates have been heated for 200 hours at 500° F. and placed in boiling water for two hours.

EXAMPLE 3

To a mixture of 100 ml. of tetrahydrofuran, 75 ml. of tetramethoxysilane and 5.3 g. of magnesium, there was added 40 ml. of

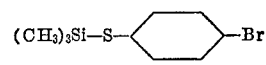

The magnesium was activated with several drops of 1,2-dibromoethane. The reaction was exothermic and kept the temperature at 75–80 C. throughout the addition. After cooling to room temperature, 21.6 g. of (CH₃)₃SiCl was added to neutralize the mixture. The mixture was then cooled to 10° C. and filtered. The filtrate was distilled free of solvent, the residue again filtered, and then 50 ml. of methanol added to the filtrate. The solution was strip distilled to obtain 36 g. of crude product which was then fractionated to obtain 12 g. (95% pure by gas-liquid chromatography) of (mercaptophenyl)trimethoxysilane having a boiling point of 140–150° C. at 15 mm. of mercury pressure. The product had a specific gravity of 1.5220 at 25° C.

A microscope slide that had been cleaned with acetone was dipped in a 0.5% aqueous methanol solution of the above prepared (mercaptophenyl)trimethoxysilane and then air-dried. The slide was then coated with a commercial polyimide resin (Skybond-700) and then dried on a hot plate at about 260° F. for about 1½ hours. The temperature was then slowly increased to about 540° F. over a period of about three hours and then held at this temperature overnight. The slide was cooled, then boiled in water for two hours, and finally examined for adhesion of the resin. Adhesion was very good indicating the (mercaptophenyl)trimethoxysilane to be a good coupling agent. When no coupling agent was used adhesion of the resin to the slide was very poor.

EXAMPLE 4

A freshly precipitated sample of carboxyphenylsiloxanol was washed free of mineral acid and then disolved in 50% aqueous acetone to obtain a clear solution containing 10% solids. This solution was stable and could be diluted with various water soluble organic solvents but became turbid when diluted with more than 90% water.

To 100 parts of the above aqueous acetone solution (0.5 molar) there was added 100 parts of a 0.5 molar aqueous triethylamine solution. A clear solution was obtained (pH 7) that was miscible with water.

To another 100 parts of the above aqueous acetone solution (0.5 molar) there was added 12.5 parts of a 1 molar aqueous ammonia solution. A clear solution was obtained (pH 4) that was infinitely soluble in water.

Solutions of the above prepared ammonium and triethylamine salts of carboxyphenylsiloxanol were diluted to 0.5% solids with water and applied to heat cleaned 181 glass cloth. The treated cloth was dried for 30 minutes in a circulating air oven at 300° F. during which time substantially all the ammonia or amine was lost leaving the glass cloth coated with a thin layer of carboxyphenylsilsesquioxane. Laminates were prepared and evaluated as in Example 1. The results are set forth in the table below.

| Coupling Agent | Initial Flexural Strength (p.s.i.) | Flexural Strength (p.s.i.) after— | | Weight percent resin in laminate |
| --- | --- | --- | --- | --- |
| | | 2 hours in boiling water | 200 hrs. at 600° F. and 2 hrs. in boiling water | |
| None* | 85,100 | 13,700 | 8,100 | 20.2 |
| $(C_2H_5)_3NH^+$ salt | 74,100 | 73,000 | 18,400 | 22.8 |
| $NH_4^+$ salt | 82,600 | 68,400 | 13,100 | 21.1 |

*Included for comparison.

EXAMPLE 5

The coupling agents of this example were prepared as follows:

(Dichloromethyl)phenyltrimethoxysilane

The residue from the preparation of (chloromethyl)phenyltrimethoxysilane in Example 2 was distilled to obtain a cut boiling at 101–110° C. at 12 mm. of mercury pressure. Analysis of this product by gas-liquid chromatography showed it to be 90–95% pure (dichloromethyl)phenyltrimethoxysilane.

(Trichloromethyl)phenyltrimethoxysilane 500 g. of tolyltrichlorosilane was placed in a one liter flask and illuminated with a fluorescent lamp while chlorine was bubbled in for 5 hours at 60–70° C. and then 20 hours at 70–115° C. Chlorination was continued until gas-liquid chromatography showed that the starting material was almost completely chlorinated to (trichloromethyl)phenyltrichlorosilane. 164.5 g. of the (trichloromethyl)phenyltrichlorosilane was methoxylated with a mixture of 240 g. of trimethylorthoformate and 4.34 g. of methanol to give 136.9 g. of (trichloromethyl)phenyltrimethoxysilane having a boiling point of 115° C. at 17 mm. of mercury pressure ($n_D^{25}$ 1.5085, $d_4^{26}$ 1.2997).

(Dimethoxymethyl)phenyltrimethoxysilane 2030 g. of tolyltrichlorosilane was chlorinated at 85–125° C. in the presence of 4.1 g. of azobisisobutyronitrile until gas-liquid chromatography indicated the presence of 18% (chloromethyl)phenyltrichlorosilane and 82% of mixed (dichloromethyl)phenyltrichlorosilane and trichloromethyl)phenyltrichlorosilane. The entire mixture was then methoxylated with 2806 g. of methanol followed by 120 g. of trimethylorthoformate to give 3070 ml. of crude product. 1535 ml. of this crude product was methoxylated on carbon with 9 moles of sodium methoxide in 3 liters of methanol, one hour at 0–10° C. followed by 20 hours at room temperature and then 7 hours at reflux. After filtering off sodium chloride the residue was stripped of methanol and vacuum distilled. During the vacuum distillation an exothermic decomposition occurred in the still pot causing the residue to heat to 300° C. Besides methanol, there was recovered 812 g. of distillate and 291 g. of charred residue. The distillate was fractionated through a spinning band column to obtain 256.7 g. of (dimethoxymethyl)phenytrimethoxysilane having a boiling point of 150° C. at 5 mm. of mercury pressure ($d_4^{25}$ 1.0877). Elemental analysis of the product showed 53.16% C and 7.45% H as compared to theoretical values of 52.99% C and 7.36% H. Nuclear magnetic resonance examination showed the ratio of $COCH_3/SiOCH_3/CH$/aromatic H to be 6.0/9.0/0.9/4.1 as compared to a theoretical ratio of 6.0/9.0/1.0/4.0. The infrared spectrum of the product was consistent with the proposed structure except for an absorption at 1728 cm.$^{-1}$ indicating the presence of a trace of an ester.

The above prepared compounds were evaluated as coupling agents using microscope slides and procedure set forth in Example 3. In all cases the adhesion of the resin to the slide was good indicating the compounds to be good coupling agents.

EXAMPLE 6

When the procedures outlined below are followed the indicated coupling agents are obtained.

Carboxybiphenylyltrichlorosilane (partial hydrolyzate)

The Grignard reagent of p-bromo-p'-methylbiphenyl is reacted with tetrachlorosilane to obtain methylbiphenylyltrichlorosilane, and finally the latter product oxidized with alkaline potassium permanganate to obtain the partial hydrolyzate of carboxybiphenylyltrichlorosilane.

(Chloromethyl)biphenylyltrichlorosilane

Methylbiphenylyltrichlorosilane prepared as above is chlorinated in the presence of a free radical catalyst to obtain (chloromethyl)biphenylyltrichlorosilane.

(Methoxymethyl)biphenylyltrimethoxysilane (Chloromethyl)biphenylyltrichlorosilane prepared above is methoxylated with a mixture of sodium methoxide and methanol to obtain (methoxymethyl)biphenylyltrimethoxysilane.

Cyanobiphenylyltrimethoxysilane

Bromobiphenylyltrichlorosilane prepared as in Example 1 is methoxylated to obtain bromobiphenylyltrimethoxysilane which is then refluxed with cuprous cyanide and methylpyrrolidinone to obtain the desired cyanobiphenylyltrimethoxysilane.

Hydroxybiphenylyltrimethoxysilane

Trimethylchlorosilane is reacted with p-hydroxy-p'-bromobiphenyl to obtain p-trimethylsiloxy-p'-bromobiphenyl, then the Grignard reagent of this product is prepared and reacted with tetrachlorosilane to obtain p-trimethylsiloxy-p'-trichlorosilylbiphenyl, then this product is methoxylated with methanol to obtain hydroxybiphenylyltrimethoxysilane.

Aminobiphenylyltriethoxysilane

A slurry of 392 g. of sodium fluosilicate, 200 g. of hydrogenated terphenyl and 287.6 g. of biphenylyltrichlorosilane was heated overnight at 150°–180° C. and then distilled to obtain 208.6 g. of biphenylyltrifluorosilane having a boiling point of 98–106° C. at 1.5 mm. of mercury pressure ($n_D^{25}$ 1.5334, $d^{25}$ 1.214 $R_D$0.255).

A solution of 119.1 g. of the above prepared biphenylyltrifluorosilane in 170 ml. of chloroform was cooled to 15° C. and then a solution of 117 g. of concentrated sulfuric acid and 52.5 g. of 90% nitric acid was slowly added over a period of 45 minutes. After warming to room temperature the organic layer was separated and filtered through Filter-Cel to remove a small amount of solid material. The solvent was then evaporated under vacuum. The infrared spectrum of the product clearly showed the presence of aromatic nitro groups (1530, 1345 cm.$^{-1}$) as well as the —SiF$_3$ structure (960, 870 cm.$^{-1}$). Without further purification the entire amount of material was refluxed with 180 g. of methyltriethoxysilane for three hours. The material was then devolatilized by heating to 130° C. at 10 mm. of mercury pressure. The 164 g. of residue was a clear dark red solution. Infrared analysis of this residue showed the presence of aryl nitro groups (1525, 1345 cm.$^{-1}$), the —SiOCH$_2$CH$_3$ structure and also some siloxane structure.

A mixture of 25 g. of the above prepared nitro-biphenylyltriethoxysilane, 1 g. of 5% palladium on carbon, 100 g. of 3 A. molecular sieves and 100 ml. of absolute ethanol was pressurized with 3 atmospheres of hydrogen. After slightly more than the theoretical amount of hydrogen had been absorbed, the material was filtered and the solid residue washed several times with ethanol. Upon removing the ethanol only 46% of the theoretical yield of the product was recovered. The product, aminobiphenylyltriethoxysilane, was a viscous black material which was soluble in acetone, ethanol and toluene as well as dilute aqueous HCl. The product was insoluble in dilute alkali, carbon tetrachloride and water. The infrared spectrum of the product showed no aryl nitro groups, but did show aminoaryl groups (3200, 3370, 3460 and 1615 cm.$^{-1}$), ethoxy silane, and siloxane structure.

That which is claimed:

1. The process of bonding
   (a) a thermally stable resinous polymer with aryl-containing recurring units, to
   (b) a solid substrate selected from the group consisting of siliceous materials, metallic oxides, and metals, comprising
      (1) applying to the surface of at least one of (a) and (b), a material
   (c) comprising a substance selected from the group consisting of compounds of the formulae (I) 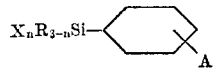

and (II) 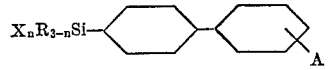

wherein X is a hydroxyl or a hydrolyzable group, R is a hydrogen atom or a monovalent hydrocarbon radical of not more than 7 carbon atoms, n has a value of 1 to 3, and A is selected from the group consisting of the —COOR, —COOR', —C(OR)$_3$, —CH(OR)$_2$, —CH$_2$OR, —CX'$_3$, —CHX'$_2$, —CH$_2$X', —CH$_2$NR$_2$, —OH, —SH, —CN, —X',

and —NR$_2$ groups wherein R' is +NHR$_3$, R is as defined above, and X' is selected from the group consisting of the chlorine, bromine and iodine atoms, A being an —OH group only when the substance has Formula II, (2) contacting (a) and (b) with each other with (c) between them while (a) is in a thermoplastic state and at least one of (a) and (b) is in a plastic state, and (3) applying energy in the form selected from the group consisting of heat and non-thermal radiant energy to the composite of (a), (b) and (c), whereby they become bonded and a bond is formed between them which is superior in hydrolytic stability to the bond between (a) and (b) alone.

2. The process of claim 1 wherein n is 3.

3. The process of claim 2 wherein (a) is a polybenzimidazole resin, (b) is glass cloth, and the energy is applied in the form of heat.

4. The process of claim 3 wherein (c) is the hydrolyzate of

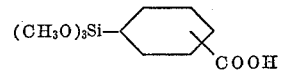

5. The process of claim 3 wherein (c) is the hydrolyzate of

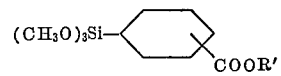

6. The process of claim 5 wherein R' is +NH(C$_2$H$_5$)$_3$.

7. The process of claim 3 wherein (c) is

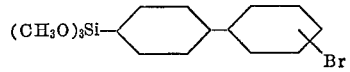

8. The process of claim 3 wherein (c) is

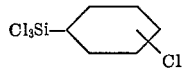

9. The process of claim 3 wherein (c) is

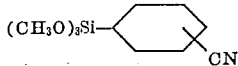

10. The process of claim 3 wherein (c) is

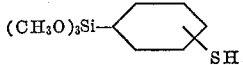

11. The process of claim 3 wherein (c) is

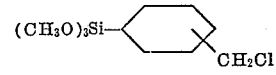

References Cited

UNITED STATES PATENTS

| | | | |
|---|---|---|---|
| 3,169,884 | 2/1965 | Marzocchi et al. | 117—126 |
| 3,213,136 | 10/1965 | Washburn et al. | 260—551 |
| 3,306,800 | 2/1967 | Pleuddemann | 156—329 |
| 3,350,345 | 10/1967 | Vanderbilt et al. | 260—41.5 |
| 3,316,212 | 4/1967 | Angelo et al. | 260—47 |

HAROLD ANSHER, Primary Examiner

D. J. FRITSCH, Assistant Examiner

U.S. Cl. X.R.

117—70, 71 72, 75, 77, 79, 124, 126; 156—331; 161—93, 193, 207